Nov. 11, 1958 R. D. JAMES ET AL 2,860,199

DATA PLAYBACK UNIT AND CIRCUIT

Filed Nov. 9, 1953 4 Sheets-Sheet 1

INVENTORS:
Richard D. James
Walter A. Jones

By Herbert E. Metcalf
Their Patent Attorneys

Nov. 11, 1958 R. D. JAMES ET AL 2,860,199

DATA PLAYBACK UNIT AND CIRCUIT

Filed Nov. 9, 1953 4 Sheets-Sheet 2

INVENTORS:
Richard D. James
Walter A. Jones

By Herbert E. Metcalf
Their Patent Attorneys

Nov. 11, 1958 R. D. JAMES ET AL 2,860,199

DATA PLAYBACK UNIT AND CIRCUIT

Filed Nov. 9, 1953 4 Sheets-Sheet 3

INVENTORS:
Richard D. James
Walter A. Jones

Herbert E. Metcalf
Their Patent Attorney

DATA PLAYBACK UNIT AND CIRCUIT

Filed Nov. 9, 1953 4 Sheets-Sheet 4

INVENTORS:
Richard D. James
Walter A. Jones
By Herbert E. Metcalf
Their Patent Attorneys 2,860,199
Patented Nov. 11, 1958

2,860,199

DATA PLAYBACK UNIT AND CIRCUIT

Richard D. James, Manhattan Beach, and Walter A. Jones, Santa Monica, Calif., assignors to Northrop Aircraft, Inc., Hawthorne, Calif., a corporation of California Application November 9, 1953, Serial No. 391,074
3 Claims. (Cl. 200—46)

This invention relates generally to perforated tape playback means and more particularly to a multiple channel, perforated metallic tape, precision playback unit. The invention also concerns a new and novel test circuit for testing playback unit performance.

Data can be recorded on tape by means of a series of punched holes made in the tape and spaced longitudinally along the length thereof in a suitable timewise relationship. This data can be reproduced by playing back the tape in a device which can detect or read the data from the tape. The signals thus derived can be used to perform certain functions, usually, for example, to operate control mechanisms. When precise control is critical, the data must be accurately and surely reproduced to avoid large control errors. It is an object of this invention to provide means for reproducing data, recorded on steel tape in the form of punched holes, with maximum reliability.

Another object of the invention is to provide compact means for simultaneous, accurate reading of a large number of channels of recorded data.

Another object of the invention is to provide means for dynamically regulating the tension of perforated tape being played back for reproduction.

And another object of this invention is to provide means for advancing or retarding the speed of moving tape being played back on the unit.

A further object of this invention is the provision of a test circuit for checking playback performance and localizing areas of faulty parts.

Still further objects and features of the invention will hereinafter appear from the following specification read in conjunction with the accompanying drawings which illustrate presently preferred embodiments of the invention.

With these and other objects in view, the invention comprises a playback unit having a perforated steel tape, for example, provided on a supply reel and driven by a sprocket around a tensioning roller, through a compact, rod actuated readout head having multiple layers of switches at different levels and rewound on a takeup reel driven by a motor through a slip clutch. A friction clutch provides a fixed load to the rotation of the supply reel. The sprocket is motor driven through one input of a differential, the other input of which can be driven by another motor to control the speed of the sprocket. In addition, a test circuit utilizing flash bulbs, certain ones being blown by malfunctioning of corresponding channels of the readout head, is provided to insure a properly operable device.

Figure 1:
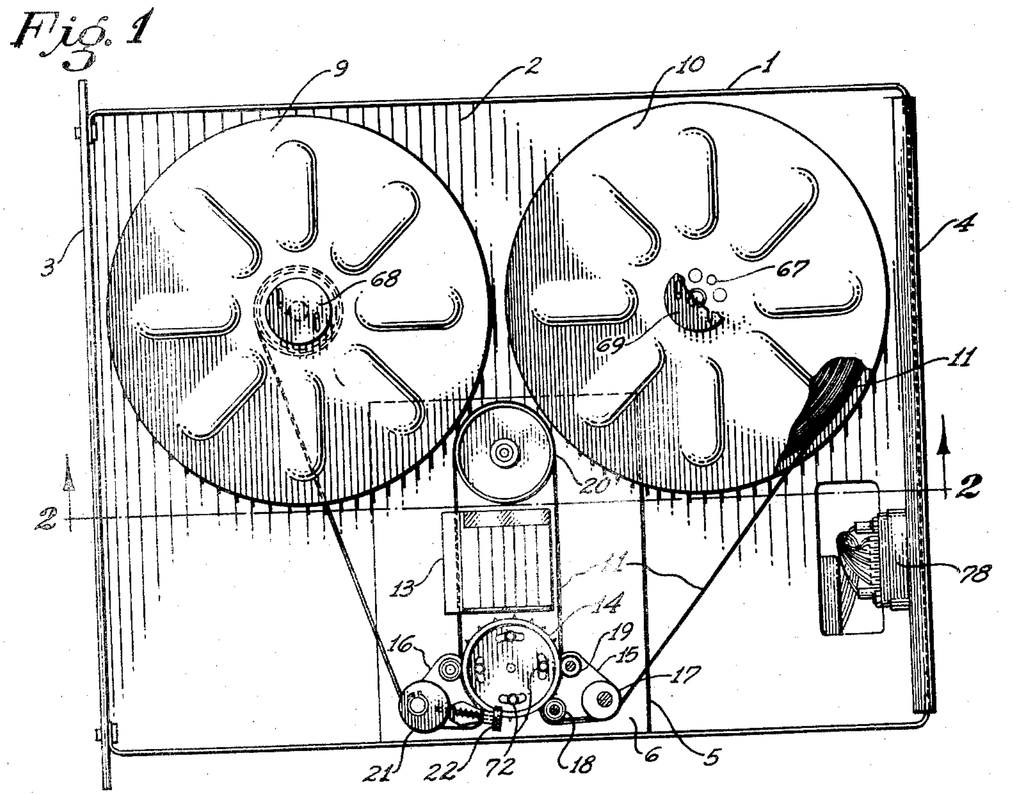
Figure 1 is a top plan view of the data playback unit.

Referring to Figure 1, there is shown a plan view of a preferred construction of a data playback unit. The unit comprises a frame 1 to which are mounted different elements of the playback unit. The frame 1 is fabricated with a base plate 2 suitably secured to side plates 3 and 4 at a distance somewhat greater than halfway below the top edges of plates 3 and 4. This is more clearly shown in Figure 2 which is a sectional view of the playback unit along line 2—2. Base plate 2 has a central cutout 5 in the fore area thereof to accommodate a heavier, flanged support plate 6. This support plate 6 is attached flat with base plate 2 to channels 7 and 8 which are, in turn, fastened to base plate 2. A takeup reel 9 is located above channel 7 and a supply reel 10 carrying a perforated steel tape 11 is positioned over channel 8. The steel tape 11 is perforated with a series of data holes 12, of which there can be a maximum of 24, for example, in a row. These holes 12 represent data which is read by a readout head 13 when the steel tape 11 is passed through the head 13.

The steel tape 11 is driven by a sprocket 14 against which the tape 11 is pressed by roller assemblies 15 and 16. The tape 11 is passed around a pivot roll 17 of assembly 15 immediately as it leaves supply reel 10 and is held against sprocket 14 by smaller rollers 18 and 19. The tape 11 is then passed around a tape tensioning roller drum 20, through the readout head 13 and around roller assembly 16 to takeup reel 9. The roller assembly 16 is eccentrically pivoted like roller assembly 15 and can be moved away from sprocket 14 by turning a knurled cap 21 which is eccentrically secured to the pivot roller. The roller assembly 16 is locked in a fixed position by a spring loaded pin 22 engaging with cap 21 when the assembly 16 is placed in correct operating position. A similar cap and locking pin are provided for the assembly 15 but have been omitted from Figure 1 for clarity.

Figure 3:
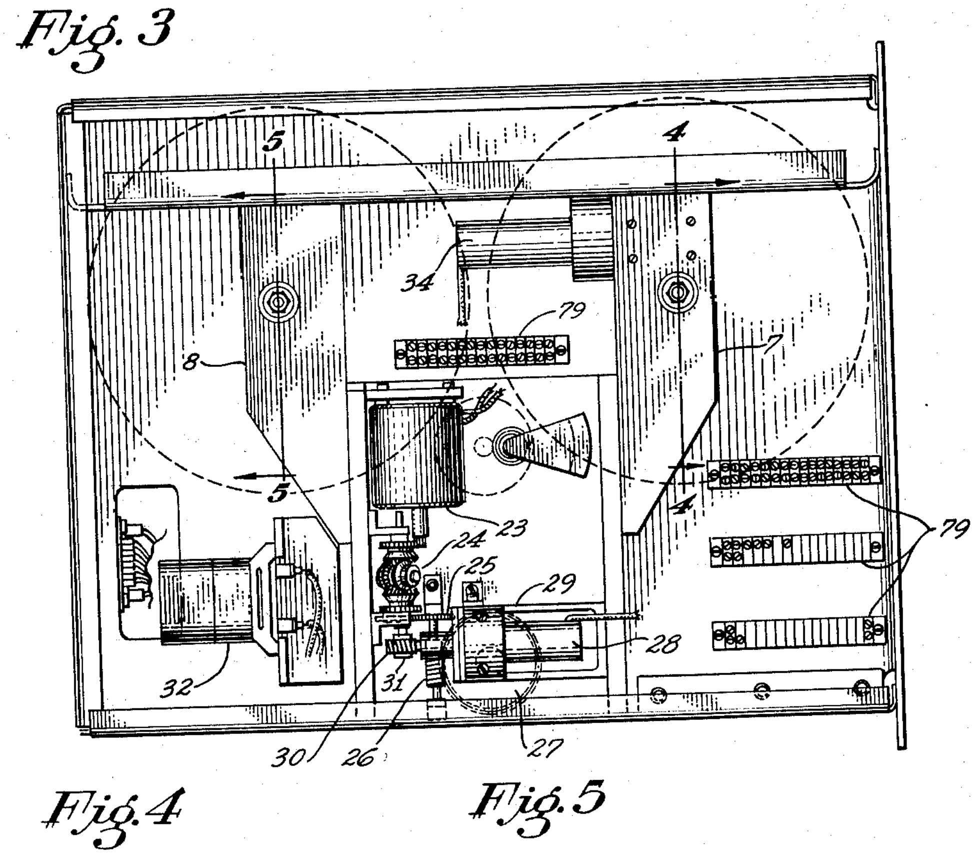
Figure 3 is a bottom plan view of the data playback unit.

The sprocket 14 which drives the tape 11 is driven by a synchronous motor 23 through gearing as shown in Figure 3. In this figure, motor 23 works through one input of a differential 24 to drive gear 25 (differential output) which is pinned to the shaft of worm gear 26. The worm gear 26 meshes with a larger gear 27 which is secured directly to the drive shaft of sprocket 14. The speed at which the tape 11 is moved can be increased or decreased by energizing a D. C. motor 28. Motor 28 is cradled in a support bracket 29 which extends over the gear 27 such that a worm gear 30 axially secured to the drive shaft of motor 28 meshes with gear 31 pinned to the drive shaft of differential 24 for another input thereto. Motor 28 can thus advance or retard the motion of sprocket 14 by rotating gear 31 (the second input) of differential 24 about the differential 24 axis thereby changing the differential output speed.

The synchronous motor 23 can be a two phase motor wherein a capacitance 32 is connected in series with one of the phase windings and connected across the same A. C. power source as is the other phase winding. This motor 23 through sprocket 14 works against the load of the perforated tape on the supply reel 10 and a clutch 33 (Figure 2) presenting a fixed friction load. The tape 11 is rewound on takeup reel 9 after passing through the readout head 13 by a D. C. motor 34 working through a slip clutch 35. These clutches are shown in detail in Figures 4 and 5 which are cross-sectional views of the two clutches.

Figure 4:
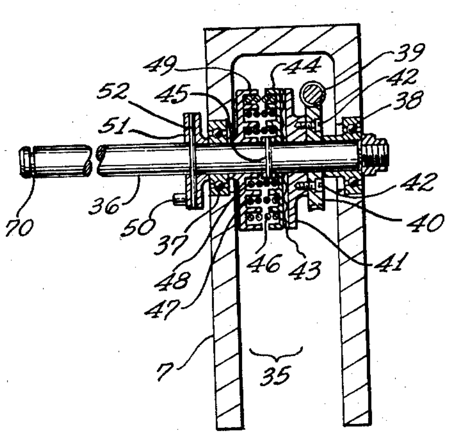
Figure 4 is a cross-sectional view on the line 4—4 of Figure 3.

In Figure 4, shaft 36 is mounted in channel 7 by frictionless bearings 37 and 38 as shown. Worm gear 39 driven by D. C. motor 34 meshes with a gear 40 which is secured to clutch plate 41 by screws 42. A corprene (neoprene and cork composition) clutch facing 43 working against clutch plate 41 drives the shaft 36 via pin 45 engaging with the slotted hub of flanged clutch plate 44. The hub is slotted to permit axial movement of clutch plate 44. The multiple flanged clutch plate 44 compresses the clutch facing 43 through action of three concentric expansion springs 46, 47 and 48 of increasing diameters located between the flange rings shown. These springs are braced against a similar multiple flanged clutch plate 49 having concentric flange rings to separate the concentric springs. Thus, the takeup reel 9, placed on shaft 36, is locked by a short pin 50 on disk 51 which is, in turn, pinned to shaft 36 by a pin 52, can be driven by D. C. motor 34 through slip clutch 35 to rewind tape 11 smoothly on the reel 9.

Figure 5:
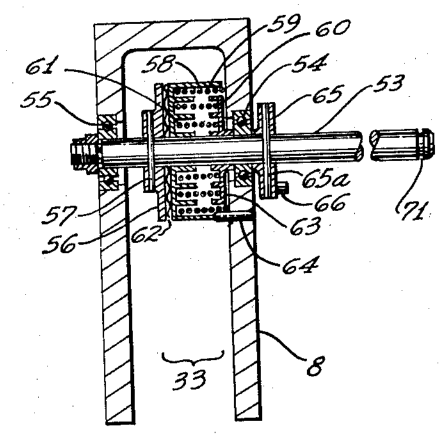
Figure 5 is a cross-sectional view on the line 5—5 of Figure 3.

Referring now to Figure 5, shaft 53 is mounted in channel 8 on frictionless bearings 54 and 55. Clutch plate 56 is pinned to shatf 53 by a pin 57. Multiple flanged clutch plate 58, having concentric flange rings to separate three expansion springs 59, 60 and 61 is forced by these springs to bear against plate 56 through a corprene friction facing 62 as shown. These springs are braced against a similar multiple flanged clutch plate 63 having concentric flange rings to separate the concentric springs. The first flanged clutch plate 58 is restrained from movement by a pin 64 which is embedded in the channel 8. The supply reel 10 mounted on shaft 53 rests on a disk 65 and is locked to disk 65 by a short pin 66. The disk 65 is secured to shaft 53 by pin 65*a*. In this way, a constant friction load is provided through the clutch 33 such that the supply reel 10 presents a continuous, non-slipping load to the sprocket drive.

The short pin 66 locks shaft 53 to supply reel 10 by mating with a hole such as 67 (Figure 1) located in the reel near the reel axis. The reels 9 and 10 are secured in place on shafts 36 and 53 by reel lock caps 68 and 69 respectively. These caps are positive locking devices which carry spring loaded blades that engage channels 70 and 71 cut near the top of shafts 36 and 53.

Figure 2:
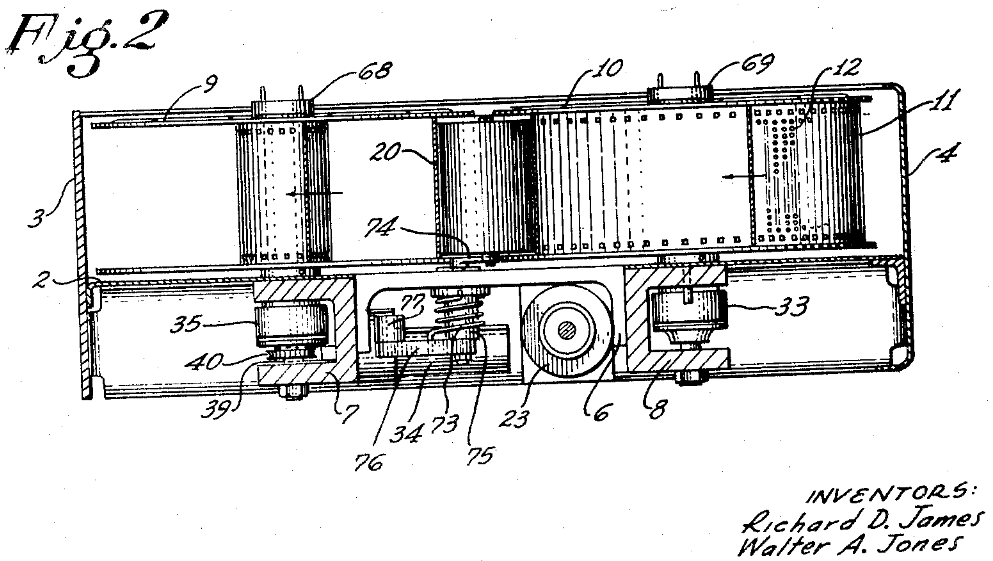
Figure 2 is a cross-sectional view on the line 2—2 of Figure 1.

Another feature of the playback unit is that sprocket 14 can be adjusted slightly to position the tape by loosening screws 72 which secure the sprocket drum to the sprocket drive shaft. The tape 11 is held in tension by the roller drum 20 which is spring loaded away from the readout head 13 by means of spring 73 working through a radius arm 74. This spring 73 is secured at one end to the shoulder of bearing sleeve 75 which is, in turn, secured to support plate 6. The other end of spring 73 is embedded to a lower radius arm 76 carrying a weight 77 at the end thereof. In correct operating position, as shown in Figure 2, the radius arm 74 carrying roller drum 20 is separated by 180 degrees with the radius arm 76 carrying the weight 77. Since the two arms are rigidly attached to the same shaft borne by sleeve 75, an acceleration tending to cause roller drum 20 to swing forward and thereby slacken tape 11 would also cause the weight 77 to swing forward which, because of the 180 degree separation of radius arms, counteracts acceleration effects on the playback unit. This is desirable to prevent malfunction of equipment when carried in aircraft, for example, where high accelerations can be encountered.

Power is supplied through a single receptacle 78 (Figure 1) which also provides enough pins for wiring to all the information channels of the readout head 13. Terminal strips 79 (Figure 3) are provided to facilitate wiring installation.

Figures 6, 7:
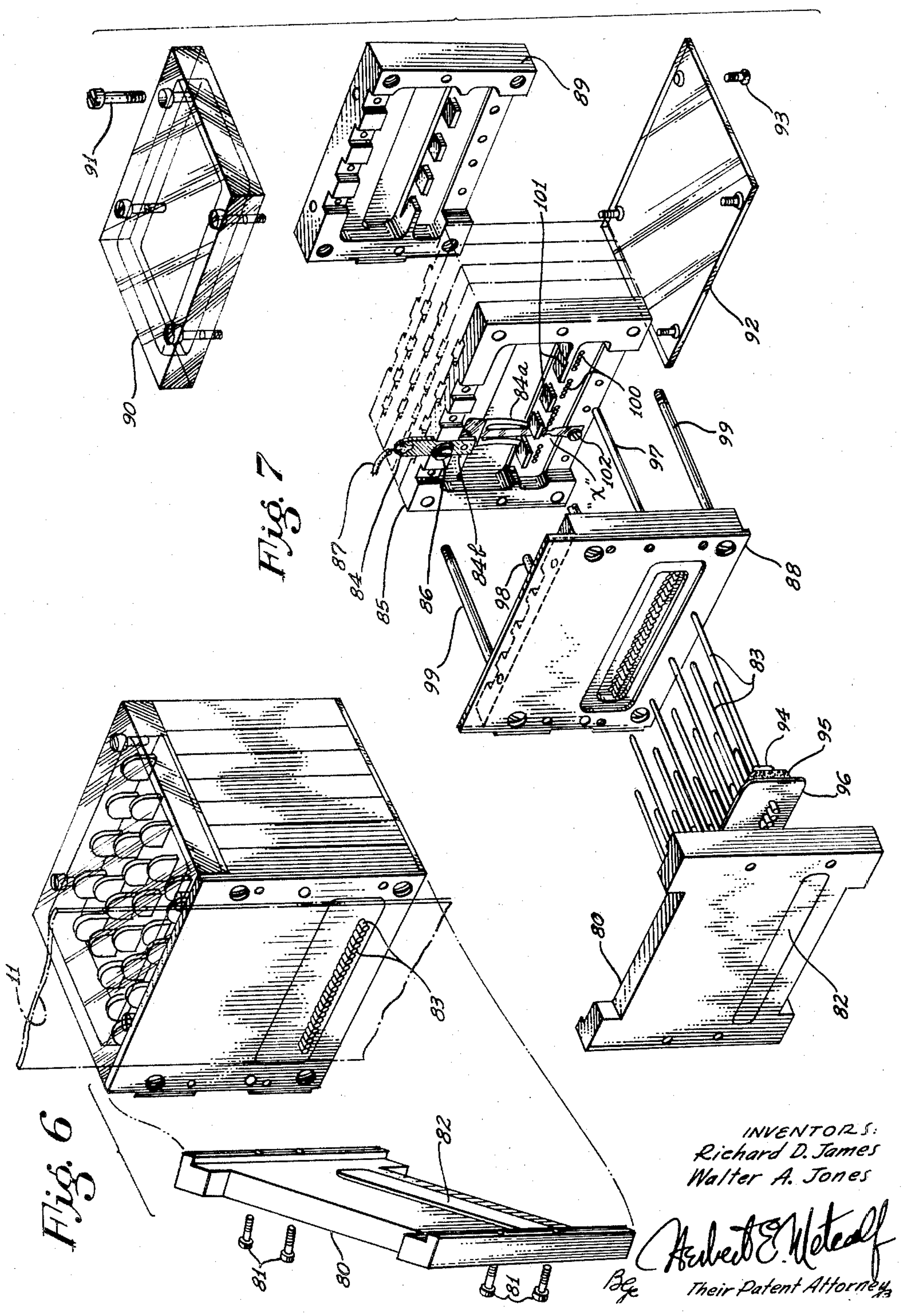
Figure 6 is a perspective view of the readout head with cover plate removed.
Figure 7 is an exploded view of the readout head showing the construction thereof.

The readout head 13 is shown in an enlarged perspective view of Figure 6. The head 13 has been revolved and cover plate 80 has been removed and set aside to show more clearly the construction of the readout head. The tape 11 is a steel tape, for example, .002 inch thick. This tape is punched with a series of holes which comprise data to be read by the readout head. There can be a maximum of 24 holes for each row across the tape. When cover plate 80 is secured in place by screws 81, the surface of the carboloy (chrome-carbide) bar 82 puts a necessary preload on the switch elements 84*a*, via the carboloy rods 83, such that the switch differential exists .001 inch below the surface of carboloy bar 82. Thus there is a .001 inch movement (upper half thickness of tape) available to open a switch and also a .001 inch movement (lower half thickness of tape) available to close the switch. Each of the 24 columns of holes on tape 11 passes over one of the rods 83. A rod 83 is depressed .002 inch by steel tape 13 until an information hole passes over the rod. When this occurs, the rod is released from a depressed position momentarily. Each rod is positioned to operate a snap action readout switch 84 as shown in the exploded view of Figure 7. The rods 83 each bear against the movable half 84*a* of a switch at nibbed point "*x*," for example. The fixed half 84*b* is secured to a switch plate 85 by a screw 86. The fixed half 84*b* is fully insulated from the surrounding structure and electrical juncture is provided only at the contacts and solder connection of wire 87. The readout switch 84 is closed whenever the actuating rod 83 falls into a punched hole on tape 11. These switches require only .0002 inch movement of a rod to operate, that is, switch hysteresis is .0002 inch, although the tape thickness provides .002 inch rod movement, making .001 inch movement available either way to actuate a switch. The bar 82 and rods 83 are fabricated of carboloy to withstand and minimize wear. The grade of carboloy used is chosen to have a coefficient of expansion the same as the steel of which the readout head structure is made.

The readout head 13 is comprised of eight steel plates including cover plate 80, switch plate 85 (typical of five similar switch plates), rod guide plate 88 and an end plate 89. In addition, a plastic cover plate 90 secured by screws 91 is provided to shield the projecting switch terminal ends, to which are connected output wires such as 87. Another plastic sheet 92 is secured to the readout head by screws 93 to fully enclose the structure. Cover plate 80 has embedded in it the carboloy bar 82. Guide plate 88 is placed under cover plate 80 and serves to align the 24 rods 83 with their respective switches. As shown in Figure 7, the guide plate 88 is recessed and shaped on one side to provide bearing surfaces for the rods 83. These rods 83 are notched near the top to accommodate the edge of a metal blade 94 which is secured in the recess to prevent the rods from rotating. The notch on a rod is wide enough to permit adequate longitudinal rod motion, however. A felt pad 95 is further provided to fill the recess with a resilient material for excluding dust and dirt from the switch mechanism. A thin metal sheet 96 is pressed into the recess against the shoulders thereof to retain felt pad 95 and to cover the opening.

The five switch plates such as 85, guide plate 88 and end plate 89 are stacked and aligned on two guide rods 97 and 98 which terminate in plates 88 and 89. All these plates are secured together by four long screws 99 passing through the corners of the plates as shown. The heads of screws 99 are countersunk in guide plate 88 and the ends screw into end plate 89. The rods 83 are of six different lengths and pass through holes 100 drilled in the different plates to actuate switches placed at six different levels. Four switches are placed at each level, the switches for each level being moved laterally one rod position for alternate levels. For example, the rods 83 shown in the exploded view of Figure 7 decrease in steps of two from adjacent rod to rod. The plate 85 is machined into shape to mount the switch elements. One of the switches is shown mounted on plate 85; the others have been omitted for illustrative clarity. It is noted that the movable switch half 84a has curved side spring leaves braced against raised segments 101 which are grooved to accept the ends of the spring leaves, the switch half being secured to plate 85 by a screw 102. These switch elements can be ordinary microswitch parts.

Figure 8:
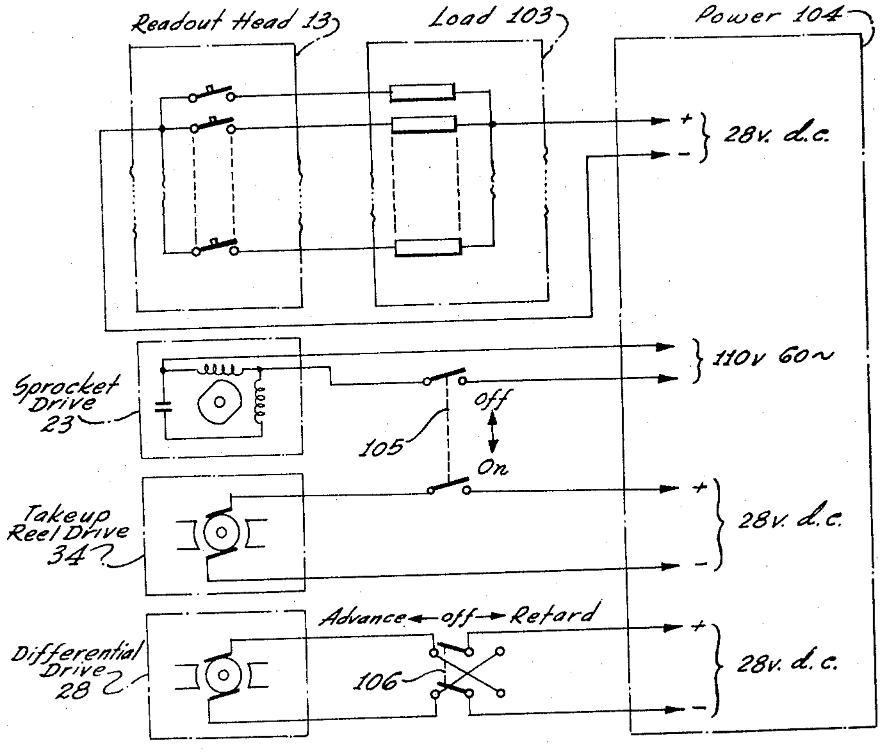
Figure 8 is a wiring diagram illustrating the control circuit for the data playback unit.

The control circuit for the data readout unit is shown in Figure 8. Three of the switches of the readout head 13 are drawn. There are, of course, 24 switches which are actuated by a moving perforated tape through control rods 83 (not shown in this figure). Each of these switches is connected in series to a load 103 and the free ends are connected together across 28 volts D. C. of power supply 104 as shown. The load 103 can be a plurality of stepper motors, for example, each connected to drive a mechanical load. The readout unit is turned on and off by means of a double pole switch 105. The switch 105 connects 110 volts A. C. power to the sprocket drive motor 23 and 28 volts D. C. to the takeup reel drive motor 34. The tape 11 can be speeded up or slowed down by operating a double pole, double throw switch 106. By placing the switch 106 in the advance position, differential drive motor 28 is connected to 28 volts D. C. to rotate in one direction. When switch 106 is placed in the retard position, the leads to motor 28 are reversed, thereby reversing the direction of rotation of motor 28. The speed of the motor 28 in driving the second input of differential 24 can thus be added to or substracted from the sprocket drive speed.

Figure 9:
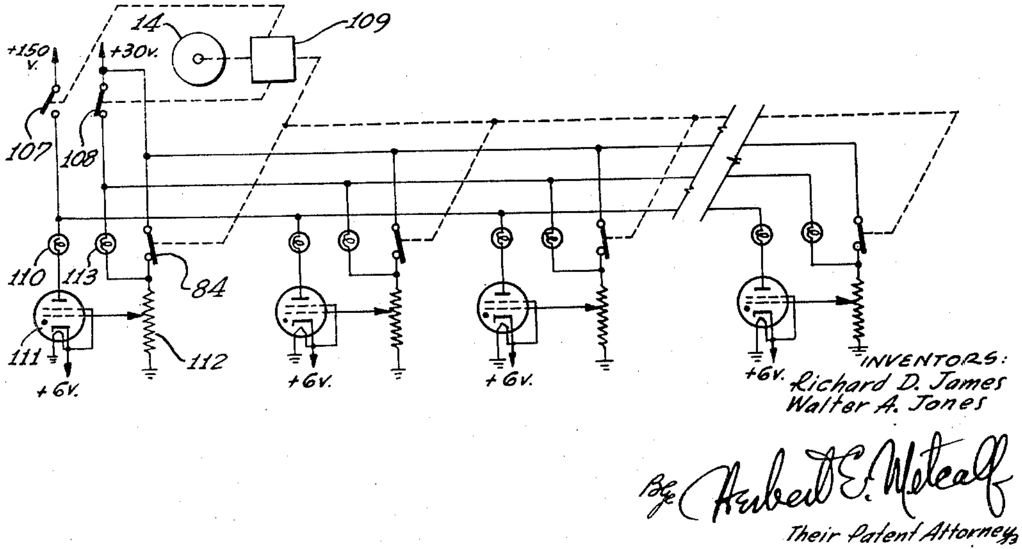
Figure 9 is a schematic wiring diagram of a test circuit to check readout performance and to isolate faulty operating parts.

Reliability of readout is the premium paid for in the readout unit. In order to determine the operational life of the readout head 13, a test circuit shown in Figure 9 was employed to establish the reliability of the readout head, which is the critical element of the unit. An endless, closed loop of tape having a complete punching of holes in all positions of each hole row is driven continuously around by the sprocket drive in this instance. In addition, two positive acting switches 107 and 108 are necessary. These two switches are actuated by cams and gearing 109 driven off the sprocket drive 14 which actuates readout switch 84 (for one channel) by motion of the perforated tape. The cams and gearing 109 are such to close switch 107 after readout switch 84 opens and to open switch 107 before readout switch 84 closes (i. e., switch 107 closes and opens when switch 84 is open). Cams and gearing 109, however, close switch 108 after readout switch 84 closes and open switch 108 before switch 84 opens (i. e., switch 108 closes and opens when switch 84 is closed). A photographic flash bulb 110 is connected in series with switch 107 and a thyratron 111. The control grid of thyratron 111 is tapped to a resistance 112 which is grounded on one end and connected in series with another flash bulb 113 and switch 108. The switch 107 is connected to +150 volts D. C. and switch 108 is connected to +30 volts D. C. as shown in Figure 9. The +30 volts D. C. is also connected to readout switch 84 which is serially connected to the ungrounded end of resistance 112. The cathode of thyratron 111 is at +6 volts D. C. Switches 107 and 108 are connected to serve all 24 channels of the readout unit but flash bulbs 110 and 113, thyratron 111 and resistance 112 are required for each channel.

In operation, the readout switches such as 84 are opened and closed by the holes in the moving endless tape actuating the control rods 83. For the first channel shown in Figure 9, readout switch 84 is thus actuated. At the same time, switches 107 and 108 are also operated according to cams and gearing 109. During the course of operations, should readout switch 84 fail to open before switch 107 closes, or fail to remain open until after switch 107 opens, then +30 volts D. C. can appear across the resistance 112 which would provide a positive grid voltage to fire the thyratron 111 which would blow flash bulb 110, because the switch 107 is closed during this period. Flash bulb 113 remains intact because switch 108 is open during the same period (when switch 84 is open). Should switch 84 fail, however, to close before switch 108 closes, or fail to remain closed until after switch 108 opens, then +30 volts D. C. is applied to the flash bulb 113 through switch 108 which causes the flash bulb to blow because switch 108 is closed during this period. Flash bulb 110 remains intact because switch 107 is open during the same period (when switch 84 is closed) and the +150 volts D. C. is disconnected from the plate of the thyratron 111. The other channels are identical to the first channel; hence, the group of 48 flash bulbs can identify the point of failure and indicate any malfunction of switches. Obviously, this circuit can also be used to test the quality of the holes punched in the steel tape, by using a proven readout unit.

Thus, there is provided a data playback unit which is characterized primarily by an extreme preciseness and reliability of operation. A very large amount of information can be carried and read by relatively simple and rugged means. An exceedingly compact readout head was provided to read 24 channels simultaneously from a steel tape less than 3 inches wide. Means to advance or retard tape motion were provided as well as means for maintaining correct dynamic tape tension. In addition, a novel circuit was provided to test and perfect the construction of the readout head and related items.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In a data playback unit of the character described, a readout head for reading a perforated tape continuously passing therethrough, comprising: a cover plate having a non-yielding bar extending laterally across the face of said cover plate; a rod guide plate having a plurality of guide holes extending perpendicularly through the face of said guide plate, said guide holes arranged in a single line transversely of the direction of tape travel; a plurality of switch rods of different lengths passing through said guide holes; a plurality of switch plates perpendicular to said switch rods and having aligned rod openings therethrough; a plurality of switches each comprising a fixed element and a movable element, said switch plates adapted to mount a plurality of said switches laterally across each said switch plate, said switch rods of different lengths passing through said rod openings of different numbers of said switch plates and positioned to respectively actuate the movable elements of said switches on said switch plates, said switch plates stacked in position providing equal rod lengths extending above said guide plate; means for securing said switch plates in said stacked position; and means for securing said cover plate to said stacked switch plates so that said non-yielding bar is positioned against said rods, the perforated tape to be passed between said non-yielding bar and said rods to compress said rods actuating said switches, the tape perforations aligned with said rods to release said rods as each perforation passes over said respective rod.

2. A readout head as set forth in claim 1 wherein said non-yielding bar and said switch rods have the same coefficient of expansion as said plates.

3. A readout head as set forth in claim 1 wherein said rods are notched near the top and means are included for restraining rotation of said rods, said means cooperating with said notches to prevent rod rotation and permit longitudinal rod motion.

References Cited in the file of this patent

UNITED STATES PATENTS

| | | |
|---|---|---|
| 1,996,815 | Kimpton et al. | Apr. 9, 1935 |
| 2,304,913 | Herzig | Dec. 15, 1942 |
| 2,352,077 | Clough | June 20, 1944 |
| 2,448,026 | Grant et al. | Aug. 13, 1948 |
| 2,575,052 | Foltzer | Nov. 13, 1951 |
| 2,620,389 | Potter | Dec. 2, 1952 |
| 2,664,251 | Berlant | Dec. 29, 1953 |
| 2,682,581 | Roggenstein | June 29, 1954 |
| 2,705,599 | McCollough | Apr. 5, 1955 |
| 2,734,954 | Kidd | Feb. 14, 1956 |